United States Patent [19]

Kawakami

[11] Patent Number: 5,260,352
[45] Date of Patent: Nov. 9, 1993

[54] OCULAR LENS MATERIAL

[75] Inventor: Yusuke Kawakami, Aichi, Japan

[73] Assignee: Menicon Co., Ltd., Nagoya, Japan

[21] Appl. No.: 12,993

[22] Filed: Feb. 3, 1993

[30] Foreign Application Priority Data

Feb. 18, 1992 [JP] Japan .................................. 4-30678

[51] Int. Cl.$^5$ ........................ G02C 7/04; C08G 69/42
[52] U.S. Cl. ................................ 523/107; 351/160 R; 528/26; 528/38; 623/6
[58] Field of Search ............... 523/107; 528/26, 38; 351/160 R; 623/6

*Primary Examiner*—Paul R. Michl
*Assistant Examiner*—Andrew E. C. Merriam
*Attorney, Agent, or Firm*—Oblon, Spivak, McClelland, Maier & Neustadt

[57] ABSTRACT

An ocular lens material consisting essentially of a polymer of an aromatic tetracarboxylic acid dianhydride with a silicon-containing diamine of the formula (I):

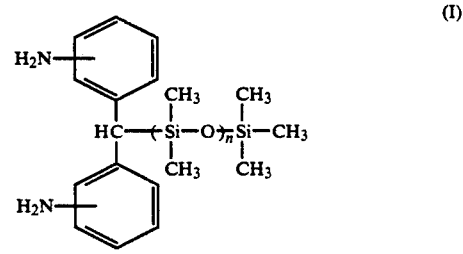

wherein n is an integer of from 0 to 10.

5 Claims, No Drawings

OCULAR LENS MATERIAL

The present invention relates to an ocular lens material. More particularly, it relates to an ocular lens material excellent in the oxygen permeability and heat resistance and useful for e.g. contact lenses or intraocular lenses.

Contact lenses are required to be excellent in oxygen permeability as one of important requirements, since it is necessary to supply an adequate amount of oxygen through the lens to the cornea so that the metabolic function of the corneal tissues will not be hindered.

Further, intraocular lenses are required to have adequate heat resistance to be durable against heating at the time of high pressure steam sterilization applied thereto prior to its intraocular insertion, as one of important requirements.

Accordingly, it is desired to develop an ocular lens having the oxygen permeability and heat resistance further improved while having good transparency of a conventional level.

Under these circumstances, the present inventors have conducted extensive researches to develop an ocular lens material excellent particularly in the oxygen permeability and heat resistance while maintaining good transparency in view of the prior art. As a result, they have found an ocular lens material which is provided with both excellent oxygen permeability required for contact lenses and excellent heat resistance required for intraocular lenses simultaneously in good balance and which at the same time is excellent in the transparency. The present invention has been accomplished on the basis of this discovery.

Thus, the present invention provides an ocular lens material consisting essentially of a polymer of an aromatic tetracarboxylic acid dianhydride with a silicon-containing diamine of the formula (I):

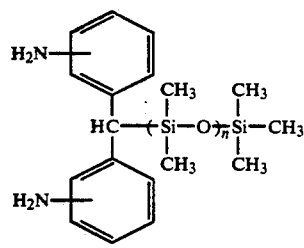

wherein n is an integer of from 0 to 10.

Now, the present invention will be described in detail with reference to the preferred embodiments.

As mentioned above, the ocular lens material of the present invention consists of a polymer of an aromatic tetracarboxylic acid dianhydride and a silicon-containing diamine of the formula (I):

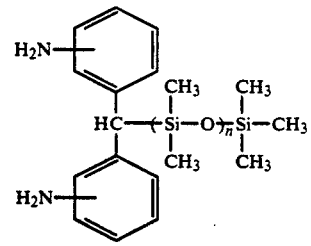

wherein n is an integer of from 0 to 10.

Specific examples of the aromatic tetracarboxylic acid dianhydride include compounds of the formulas:

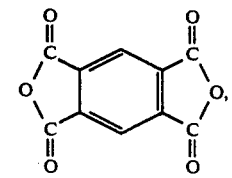

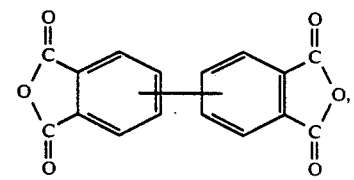

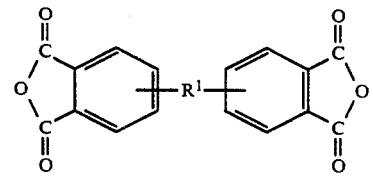

wherein $R^1$ is —O—, —CO—, —SO$_2$, —CH$_2$—, —C(CH$_3$)$_2$— or —C(CF$_3$)$_2$—, and a compound of the formula:

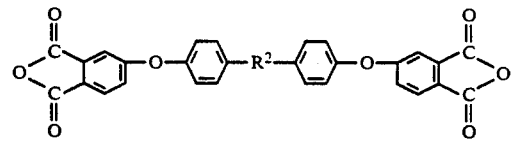

wherein $R^2$ is —C(CH$_3$)$_2$— or —C(CF$_3$)$_2$—. These compounds may be used alone or in combination as a mixture of two or more of them.

As the silicon-containing diamine, a compound of the formula (I) is used, as mentioned above. In the formula (I), n is an integer of from 0 to 10. If n is an integer of 11 or more, the lens tends to be poor in the shape-maintaining property, such being undesirable.

Specific examples of the silicon-containing diamine include bis(4-aminophenyl)methyltrimethylsilane, bis(4-aminophenyl)methylpentamethyldisiloxane, 1-bis(4-aminophenyl)methyl)heptamethyltrisiloxane and 1-(bis(4-aminophenyl)methyl)nonamethyltetrasiloxane. These silicon-containing diamines may be used alone or in combination as a mixture of two or more of them.

The molar ratio of the aromatic tetracarboxylic acid dianhydride to the silicon-containing diamine is usually from 30/70 to 70/30, preferably from 40/60 to 60/40. If the molar ratio is outside the above range, the molecular weight of the resulting polymer tends to be small. In the present invention, it is particularly preferred that the ratio is substantially equimolar.

As a method for producing the ocular lens material (hereinafter referred to as a polyimide) from the aromatic tetracarboxylic acid dianhdyride and the silicon-containing diamine, there may, for example, be mentioned a method wherein the above tetracarboxylic acid dianhydride and the silicon-containing diamine are polymerized in an organic polar solvent at a temperature of from room temperature to 80° C. to obtain a polyamide acid, and using an organic polar solvent solution of the polyamide acid, an ocular lens having a desired shape is molded, and the molded product is treated in air or in an inert gas at a temperature of from 50° to 350° C. under atmospheric pressure or reduced pressure to evaporate and remove the above organic polar solvent and at the same time to dehydrate the polyamide acid for ring-closure to obtain a polyimide, or a method wherein removal of the solvent and imidation of the above polyamide acid are conducted by means of e.g. a benzene solution of pyridine and acetic anhydride, to obtain a polyimide.

In the former method, it is also possible to isolate the polyamide acid by reprecipitation, followed by dehydration and ring-closure by heating or chemically by means of an imidation agent, or a solution after the preparation of the polyamide acid is heated by itself at a temperature of at least 100° C. for imidation to form a precipitate in the solution, and the precipitate is collected by filtration and washed to obtain a polyimide.

As the above organic polar solvent, an amide-type organic polar solvent such as N,N-dimethylformamide or N,N-dimethylacetamide may, for example, be mentioned as a suitable solvent. Such organic polar solvents may be used alone or in combination as a mixture of two or more of them. Among such organic polar solvents, the one having a boiling point of not higher than 170° C., such as N,N-dimethylacetamide, is preferred.

The amide-type organic polar solvent such as N,N-dimethylacetamide has a low boiling point, and when the polyamide acid solution is heated for dehydration and ring-closure to obtain a polyimide, the solvent will evaporate before being decomposed. This is the reason why such a solvent is preferably used in the present invention.

However, it is advisable to avoid using N-methyl-2-pyrrolidone as the organic polar solvent. N-methyl-2-pyrrolidone will partially decompose by the heat at the time of heating the molded product of the polyamide acid solution for dehydration and ring-closure to obtain a polyimide, and the decomposed product tends to remain and present a blackish brown color, whereby the formed polyimide tends to be colored yellowish brown. However, if N-methyl-2-pyrrolidone is used as a solvent for polymerization to prepare a polyamide acid, and then the obtained polyamide acid solution is put into a poor solvent to the polyamide acid, such as water, to reprecipitate the polyamide acid, followed by imidation in the absence of the solvent for polymerization, or if the polyamide acid is re-dissolved in other preferred solvent, followed by imidation, it is possible to avoid the adverse affect of coloring by N-methyl-2-pyrrolidone.

Further, when the above organic polar solvent is used, a poor solvent or good solvent which does not impair the transparency such as ethanol, toluene, benzene, xylene, dioxane, tetrahydrofuran (hereinafter referred to simply as THF) or nitrobenzene may be mixed alone or in combination to the above organic polar solvent to such an extent not to impair the solubility. However, it such a solvent is used in a large amount, it tends to adversely affect the solubility of the formed polyamide acid. Therefore, its amount is preferably less than 50% by weight of the entire solvent, more preferably not more than 30% by weight.

The following three methods may be mentioned as methods for preparing an ocular lens by using the above-mentioned polyimide.

The first method is a method which comprises casting the above-mentioned polyamide acid solution in a prescribed thickness on e.g. a mirror-finished glass plate or stainless steel plate, gradually heating it at a temperature of from 100° to 350° C. for dehydration and ring-closure to imidate the polyamide acid and to form a polyimide film, overlaying such films one on another in a necessary number of sheets to form a plate-like molded product having a predetermined thickness, and subjecting the plate-like molded product to heat compression molding at a temperature of from 200° to 400° C. under a pressure of from 0.5 to 10 t/cm$^2$ for from 0.1 to 10 hours to obtain a transparent polyimide molded product, and then machining the molded product into an ocular lens shape by means of e.g. a cutting apparatus and a polishing apparatus.

The heating and removal of the organic polar solvent at the time of heating the above polyamide acid solution for dehydration and ring-closure to imidate the polyamide acid, may be conducted continuously, or such operations may be conducted under reduced pressure or in an inert gas atmosphere.

As another method for forming the above polyimide film, there may, for example, be mentioned a method which comprises casting the above polyamide acid solution on a glass plate, heating it at a temperature of from 100 to 150° C. for from 30 to 120 minutes to form a coating film, immersing this coating film in e.g. a benzene solution of pyridine and acetic anhydride to remove the solvent and to conduct the imidation so that the coating film will be converted to a polyimide film.

The second method is a method which comprises putting the polyamide acid solution into a poor solvent such as water or methanol to reprecipitate the polyamide acid, recovering the precipitated polyamide acid and heating it at a temperature of from 100 to 350° C. for dehydration and ring-closure for imidation, then pulverizing the product to obtain a powdery polyimide, subjecting the powdery polyimide to heat compression molding at a temperature of from 200° to 400° C. under a pressure of from 0.5 to 10 t/cm$^2$ for from 0.1 to 10 hours in the same manner as in the first method to obtain a transparent polyimide molded product, and machining the molded product into an ocular lens in the same manner as in the first method.

In the second method, as another method for preparing the powdery polyimide, there may, for example, be mentioned a method which comprises heating the polyamide acid solution at a temperature of from 100° to 200° C. under stirring to convert the polyamide acid to a polyimide, which is precipitated and taken out as a precipitate out of the system. This method has a merit in that simply after washing and drying, the polyimide can be subjected to heat compression molding.

The third method is a method which comprises forming a molded product of polyimide directly from the polyamide acid, as opposed to the heat compression molding as in the first and second methods, and machining the molded product of polyimide into an ocular lens in the same manner as in the first method.

By a conventional drying method, it is difficult to suppress foaming during drying, and it is difficult to obtain a uniform polyimide molded product having a thickness of at least 150 μm. Whereas, according to the above third method, it is possible to form a polyimide molded product having a thickness of at least 500 μm without foaming, by leaving the polyamide acid solution to stand under reduced pressure for a long period of time and heating the solution from its interior by means of a far infrared ray or a microwave. Namely, by means of a far infrared ray or a microwave, a uniform polyimide molded product can be prepared directly from the polyamide acid.

In the above first to third methods, as a method for preparing an ocular lens from the molded product of polyimide by machining, there may, for example, be mentioned a method of preparing an ocular lens by conducting curved surface polishing to meet the power of the lens. When a polyimide film is prepared, an ocular lens can be prepared by conducting molding simultaneously with imidation by means of a mold which gives a shape of e.g. a contact lens or an intraocular lens, as opposed to preparing an ocular lens from the polyimide film by machining. In such a case, machine finishing may be applied to the obtained ocular lens, as the case requires.

As an example of the ocular lens, in a case where an intraocular lens is to be prepared, a hole for attaching a fixing part may be formed in the intraocular lens, and the fixing part may be welded at this hole by spot welding.

There is no particular restriction as to the shape of the fixing part of the intraocular lens, and the shape may suitably be adjusted depending upon the particular purpose. The material for the fixing part may, for example, be polypropylene, polyvinylidene fluoride or polymethyl methacrylate. However, the present invention is by no means restricted to such specific examples. In the present invention, the material for the fixing part may be the same material as the lens portion of the intramolecular lens.

Further, in the present invention, an intramolecular lens may be prepared by a method wherein the lens portion and the fixing part may be integrally molded, as opposed to the method wherein the lens portion and the fixing part are prepared separately and then welded together. Such an intramolecular lens having the lens portion and the fixing part integrally molded, has no joint portion of the two and thus is free from such a happening that the fixing part is detached from the lens portion.

Now, the ocular lens material of the present invention will be described in further detail with reference to Examples. However, it should be understood that the present invention is by no means restricted to such specific Examples.

PREPARATION EXAMPLE 1

Preparation of bis(4-aminophenyl)methyltrimethylsilane

Into a 300 ml flask flushed with nitrogen, 47.5 g. (0.10 mol) of bis({4-bis(trimethylsily)amono}phenyl)methane 69 ml (0.11 mol) of a 15% hexane solution of n-butyl lithium and 12.9 g (0.11 mol) of tetramethylethylenediamine were sequentially introduced at room temperature. The mixture was left to stand at room temperature for 3 hours, and then 24.7 ml (0.19 mol) of trimethylchlorosilane dissolved in 145 ml of THF was added into the flask at 0° C. for over a period of 30 minutes by means of a dropping funnel. The mixture was reacted overnight. After removing a volatile substance, hexane was added, and the precipitated salt was filtered off. The hexane solution was concentrated to an oily state, and 200 ml of ethyl ether and 24.0 g (0.40 mol) of glacial acetic acid were added thereto. The solution was stirred overnight at room temperature. Then, 100 ml of water was added to the flask, and the ether solution was extracted three times with water to remove glacial acetic acid. The ether solution was dried over anhydrous magnesium sulfate and evaporated to dryness to obtain a crude product. The product was separated by silica gel column chromatography. Elution degree Rf was 0.4 (eluent ethyl ether:hexane=5:2 (volume ratio)). The yield was 68%.

Using a NMR spectrometer (Model: Gemini 200, manufactured by Varian), the proton NMR spectrum was measured in CDCl$_3$, whereby the chemical shift was as follows.

−0.02(s, 9H, SiC$\underline{H}$$_3$)

3.25(s, 1H, C$\underline{H}$)

3.46(broad s, 4H, N$\underline{H}$$_2$)

6.63(d, 4H, J = 6.4 Hz,

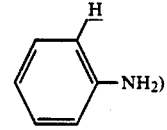

6.97(d, 4H, J = 6.4 Hz,

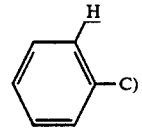

PREPARATION EXAMPLE 2

Preparation of bis(4-aminophenyl)methylpentamethyldisiloxane

A reaction product was prepared and separated in the same manner as in Preparation Example 1 except that pentamethylchlorodisiloxane was used instead of trimethylchlorosilane. Rf was 0.4 (eluent ethyl ether: hexane=5:2 (volume ratio)). The yield was 63%.

Further, the proton NMR spectrum was measured in the same manner as in Preparation Example 1, whereby the chemical shift was as follows.

−0.03(s, 9H, Si(CH$_3$)$_3$)

0.00(s, 6H, CHSi(C$\underline{H}$$_3$)$_2$)

3.20(s, 1H, C$\underline{H}$)

3.48(broad, s, 4H, NH$_2$)

The aromatic proton appeared at the same position as bis(4-aminophenyl)methyltrimethylsilane.

PREPARATION EXAMPLE 3

Preparation of 1-(bis(4-aminphenyl)methyl)heptamethyltrisiloxane

A reaction product was prepared and separated in the same manner as in Preparation Example 1 except that 1-chloroheptamethyltrisiloxane was used instead of trimethylchlorosilane. Rf was 0.3 (eluent ethyl ether: hexane=5:2 (volume ratio)). The yield was 59%.

Further, the proton NMR spectrum was measured in the same manner as in Preparation Example 1, whereby the chemical shift was as follows.
—0.08(s, 9H, Si(CH$_3$)$_3$)
0.02(s, 6H, OSi(C$\underline{H}_3$)$_2$O)
0.05(s, 6H, CHSi(C$\underline{H}_3$)$_2$)

Methine, amino and aromatic proton appeared at the same position as bis(4-aminophenyl)methylpentamethyl disiloxane.

PREPARATION EXAMPLE 4

Preparation of 1-(bis(4-aminophenyl)methyl)nonamethyltetrasiloxane

A reaction product was prepared and separated in the same manner as in Preparation Example 1 except that 1-chlorononamethyltetrasiloxane was used instead of trimethylchlorosilane. Rf was 0.3 (eluent ethyl ether: hexane=5:2 (volume ratio)). The yield was 58%.

Further, the proton NMR spectrum was measured in the same manner as in Preparation Example 1, whereby the chemical shift was as follows.
0.07(s, 9H, Si(CH$_3$)$_3$)
0.01, 0.03(2s, 12$\underline{H}$, OSi(CH$_3$)$_2$O)
0.06(s, 6H, CHSi(CH$_3$)$_2$)

Methine, amino and aromatic proton appeared at the same position as bis(4-aminophenyl)methylpentamethyldisiloxane.

EXAMPLE 1

Into a flask flushed with nitrogen, 0.655 g (3.00 mmol) of pyromellitic acid dianhydride was introduced, and 1.034 g (3.00 mmol) of bis(4-aminophenyl)methylpentamethyldisiloxane obtained in Preparation Example 2 and dissolved in 10 ml of dimethylacetamide, was added thereto. The mixture in the flask was reacted for 12 hours at 60° C. The solution was concentrated to obtain a 15% solution of polyamide acid.

The obtained 15% solution of polyamide acid in dimethylacetamide was spread on a clean glass plate and maintained at 80° C. in an oven. The temperature of the oven was gradually raised to 240° C. over a period of 5 hours. After the heating, the coated glass plate was left to stand under vacuum for 2 hours, and the obtained film was peeled off from the glass plate.

The oxygen permeability coefficient (hereinafter referred to simply as PO$_2$) of the film was measured in accordance with the following measuring method and found to be $7.8 \times 10^{-10}$ cm$^3$ (STP)·cm/(cm$^2$·sec·cmHg).

Further, the obtained film had an adequate transparency as a lens, and when it was subjected to high pressure steam sterilization (at a temperature of 121° C. for 20 minutes), no change was observed, thus showing excellent heat resistance.

Method for measuring PO$_2$

Using a Yanako gas permeability measuring system (Model: GTR-20, manufactured by Kabushiki Kaisha Yanagimoto Seisakusho), the pressure on the upstream side was set at 1 atm and the pressure on the downstream side was set at 0 atm at 25° C. in accordance with a different pressure method, whereby the amount of the permeated gas was measured by gas chromatography, and PO$_2$ was examined.

EXAMPLE 2

A film was prepared in the same manner as in Example 1 except that bis(4-aminophenyl)methyltrimethylsilane (3.00 mmol) obtained in Preparation Example 1 was used instead of bis(4-aminophenyl)methylpentamethyldisiloxane obtained in Preparation Example 2. With respect to the obtained film, PO$_2$ was measured in the same manner as in Example 1 and found to be $3.3 \times 10^{-10}$ cm$^3$ (STP)·cm/(cm$^2$·sec·cmHg).

Further, the obtained film had an adequate transparency as a lens, and when it was subjected to high pressure steam sterilization (at a temperature of 121° C. for 20 minutes), no change was observed, thus showing excellent heat resistance.

EXAMPLE 3

A film was prepared in the same manner as in Example 1 except that 1-(bis(4-aminophenyl)methyl)heptamethyltrisiloxane (3.00 mmol) obtained in Preparation Example 3 was used instead of bis(4-aminophenyl)methylpentamethyldisiloxane obtained in Preparation Example 2. With respect to the obtained film, PO$_2$ was measured in the same manner as in Example 1 and found to be $12 \times 10^{-10}$ cm$^3$ (STP) cm/(cm$^2$·sec·cmHg).

Further, the obtained film had an adequate transparency as a lens, and when it was subjected to high pressure steam sterilization (at a temperature of 121° C., for 20 minutes), no change was observed, thus showing excellent heat resistance.

COMPARATIVE EXAMPLE 1

A film was prepared in the same manner as in Example 1 except that bis(4-aminophenyl)methane was used instead of bis(4-aminophenyl)methylpentamethyldisiloxane obtained in Preparation Example 2. With respect to the obtained film, PO$_2$ was measured in the same manner as in Example 1, whereby PO$_2$ was found to be $0.39 \times 10^{-10}$ cm$^3$ (STP)·cm/(cm$^2$·sec·cmHg), which was substantially lower than PO$_2$ of any one of the materials prepared in Examples 1 to 3.

The ocular lens material of the present invention is particularly excellent in the oxygen permeability and heat resistance while having good transparency. Thus, it is particularly useful for intraocular lenses and contact lenses.

I claim:

1. An ocular lens material consisting essentially of a polymer of an aromatic tetracarboxlic acid dianhydride with a silicon-containing diamine of the formula (I):

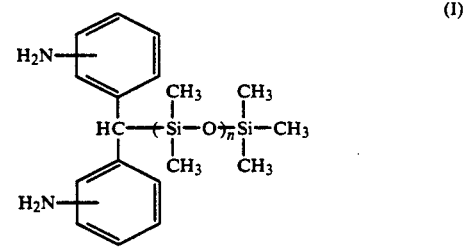

(I)

wherein n is an integer of from 0 to 10.

2. The ocular lens material according to claim 1, wherein the aromatic tetracarboxylic acid dianhydride is at least one member selected from the group consisting of compounds of the following formulas:

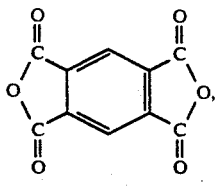

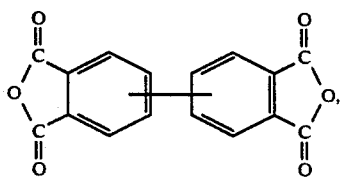

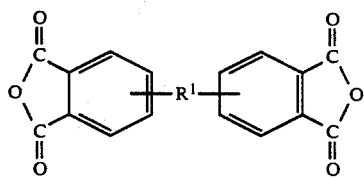

wherein $R^1$ is —O—, —CO—, —SO$_2$—, —CH$_2$—, —C(CH$_3$)$_2$— or —C(CF$_3$)$_2$—, and

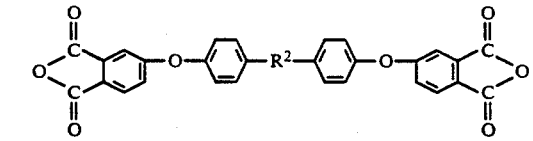

wherein $R^2$ is —C(CH$_3$)$_2$— or —C(CF$_3$)$_2$—.

3. The ocular lens material according to claim 1, wherein the silicon-containing diamine of the formula (I) is at least one member selected from the group consisting of bis(4-aminophenyl)methyltrimethylsilane, bis(4-aminophenyl)methylpentamethyldisiloxane, 1-(bis(4-aminophenyl)methyl)heptamethyltrisiloxane and 1-(bis(4-aminophenyl)methyl)nonamethyltetrasiloxane.

4. The ocular lens material according to claim 1, wherein the molar ratio of the aromatic tetracarboxylic acid dianhydride to the silicon-containing diamine is from 30/70 to 70/30.

5. The ocular lens material according to claim 1, wherein the molar ratio of the aromatic tetracarboxylic acid dianhydride to the silicon-containing diamine is from 40/60 to 60/40.

* * * * *